A. BRONSON.

Cooking Stove.

No. 559.

Reissued May 18, 1858.

Witnesses

Wm A Bishop

Wm C Brown

Inventor

Austin Bronson

N. PETERS, Photo-Lithographer, Washington, D. C.

UNITED STATES PATENT OFFICE.

AUSTIN BRONSON, OF EAST PORT CHESTER, CONNECTICUT.

IMPROVEMENT IN COOKING-STOVES.

Specification forming part of Letters Patent No. 5,721, dated August 22, 1848; Reissue No. 559, dated May 18, 1858.

*To all whom it may concern:*

Be it known that I, AUSTIN BRONSON, now of East Port Chester, in the county of Fairfield and State of Connecticut, but formerly of Peekskill, Westchester county, and State of New York, have invented a certain new and useful Improvement in Cooking-Stoves; and I do hereby declare that the following is a full, clear, and exact description thereof, reference being had to the accompanying drawings, making part of this specification, in which—

Figure 1:
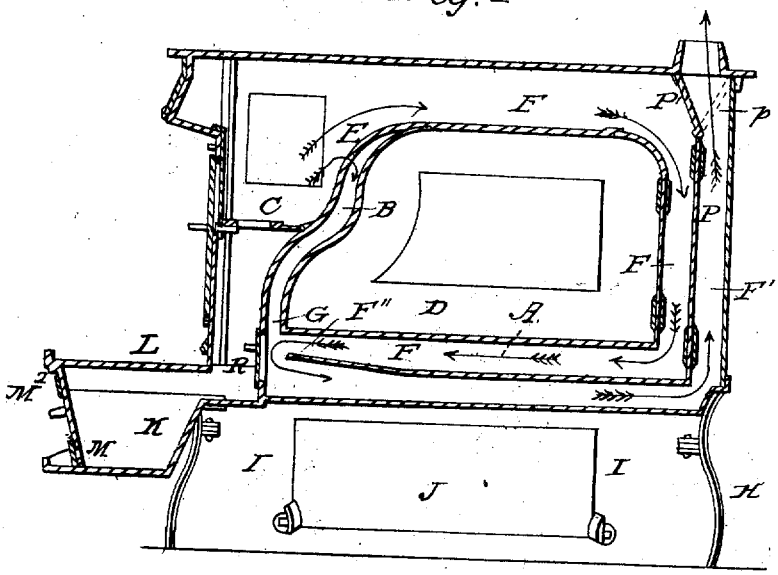
Figure 2:
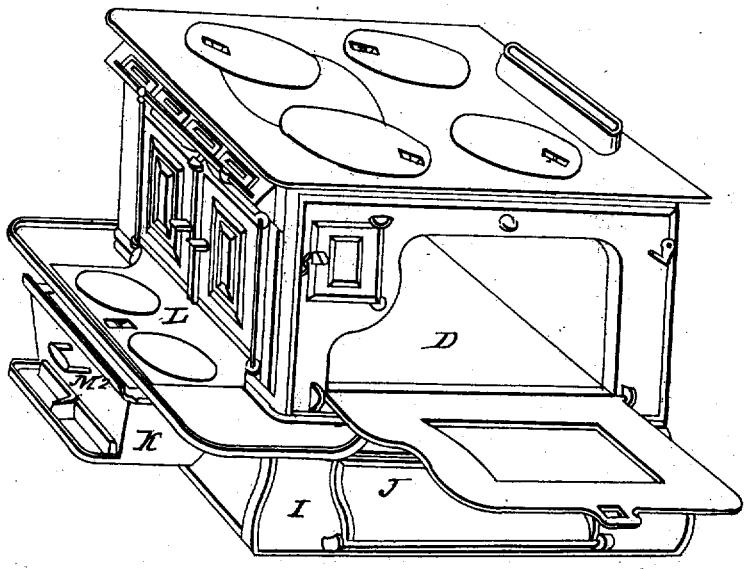

Figure 1 is a longitudinal vertical section of the stove, and Fig. 2 a perspective view thereof.

The same letters indicate like parts in all the figures.

The object of the said invention is to equalize the heat of the oven in cooking-stoves. The heat of the products of combustion is so much reduced by the time they reach the flue under the bottom of the oven that such bottom is less heated than the top, front, and back; and in this class of stoves the front of the oven is too highly heated when the front plate of the oven is also the back plate of the fire-chamber; and when the bottom of the fire-chamber is above the level of the bottom of the oven the upper portion of the front of the oven is too much heated and the lower portion of the front not sufficiently heated. I have obviated these difficulties by my invention, which consists in combining with the return-flues which pass around the oven a heat-equalizing chamber, which is interposed between the front plate of the oven and the back plate of the fire-chamber, which said chamber extends down to and communicates with the flues below the oven, so that the said chamber so interposed between the front oven-plate and the back plate of the fire-chamber shall prevent the front of the oven from being overheated, while at the same time, by the connection of the lower end of this chamber with the flues, the heat given out to this chamber is drawn off by the circulation in the flues, thereby preventing the front of the oven from being overheated, and at the same time the heat which passes under the oven is increased. The said chamber has the further effect of equalizing the heat along the entire front of the oven when the fire-chamber is elevated above the level of the bottom of the oven.

In the accompanying drawings, C represents an elevated fire-chamber in front of the upper part of the oven D. The products of combustion pass up directly from the fire-chamber in the flue F over the oven, down the back and under the oven to the front, and thence around the front end of the partition A to the return-flue F′ under the oven, and up the back to the exit-pipe, and by means of a damper, P′ *p*, at the upper end of the partition P the said products can be carried directly out instead of passing around the oven. For the purpose of concentrating the heat against the bottom of the oven and toward the front end thereof, the forward portion of the partition A may be bent up slightly to gradually contract the forward portion, F″, of the flue under the oven. A heat-equalizing chamber, B, is formed between the front plate of the oven and the back plate of the fire-chamber, which chamber extends down to and communicates at G with the front end of the flue F under the oven. This heat-equalizing chamber is provided with an aperture or apertures, E, through the back plate of the fire-chamber, to facilitate the discharge of heated air from the said chamber into the flue.

The space H beneath the stove and above the floor, which is usually left open, I close by means of curved ornamented plates I, forming a chamber, in which articles may be kept warm, the heat in passing through the bottom flue F′ being sufficient to retain the temperature of this chamber at a proper degree. The curved side plates of this chamber are provided with doors J, at which to introduce the articles to be kept warm.

An ash or ember drawer, K, for catching the ashes and hot embers which fall from the fire-chamber, is inserted into grooves or lodged upon ledges formed on the under side of the hearth-plate. It is provided with a movable top plate, L, containing a number of apertures for the introduction of various culinary vessels and lids; also with an opening, M, in front of said drawer for the removal of the ashes and for the admission of air. It is also provided with a handle, $M^2$, by which it is removed from the stove to any place where it may be required to be used. There is an opening in the hearth-plate corresponding with the size of the drawer over which the aforesaid plate L is placed. This drawer is made movable for the purpose of applying the heat therein to culinary operations in a common fire-place, or in any convenient place, to avoid the annoyance from heat, &c., from the stove in the summer or warm weather. It forms an excellent portable furnace and fuel-saver.

The damper R is designed to close the opening at which the middle flue F′ is cleaned. It is simply a sliding damper having a handle, by which it is raised or lowered.

I am aware that prior to my invention a chamber has been interposed between the oven and fire-chamber to prevent the overheating of the front of the oven; but in such cases the said chamber has been provided with apertures through the sides of the stove to receive cold air from the room to circulate through such chamber, and hence such a chamber does not involve the principle of my said invention, and could not produce the same effect, as the introduction and heating of cold air thus introduced, instead of increasing, would necessarily decrease, the heat, and could only prevent the overheating of the front of the oven, without increasing the heat at the bottom of the oven, which is the leading object of my said invention.

What I claim as my invention, and desire to secure by Letters Patent, is—

The employment of the heat-equalizing chamber, interposed between the fire-chamber and the oven, substantially as described, when used in combination with and made to communicate directly with the flues below the oven, substantially as described, and for the purpose specified.

AUSTIN BRONSON.

Witnesses:
WM. H. BISHOP,
WM. C. BROWN.